Patented Feb. 21, 1933

1,898,707

UNITED STATES PATENT OFFICE

CHESTER L. BAKER, OF BERKELEY, CALIFORNIA, ASSIGNOR TO PHILADELPHIA QUARTZ COMPANY OF CALIFORNIA, LTD., OF BERKELEY, CALIFORNIA, A CORPORATION OF CALIFORNIA

CRYSTALLINE HYDRATES OF ALKALI METAL SILICATES AND METHOD OF PRODUCING THEM

No Drawing.   Application filed July 1, 1930.   Serial No. 465,245.

This invention relates to a method of preparing crystalline silicates of the alkali metals in stable forms, as well as to the products produced thereby.

Sodium silicate, as generally understood, refers to solid, glass-like bodies containing sodium oxide and silica in varying ratios or to solutions of these in water. These products usually contain two or more parts of silica for each part of $Na_2O$ and the solutions are syrupy, sticky, liquids which have no tendency to crystallize under ordinary conditions. Although certain crystalline sodium silicates have been known to science for some time, they have not attained the significance in industry which they merit, principally because of difficulties in preparing them in acceptable physical form and the problems which arise in attempting to use them as heretofore made.

Sodium metasilicate crystallizes from mother liquors which are sticky in character and difficult to remove from the crystals so that the crystalline product or mixtures containing it, tend to agglomerate into solid masses difficult to handle. Furthermore, previous products have been characterized by a certain instability, as will appear more fully hereinafter, which may be due to reactions between the individual particles in contact, notably the transition from one hydrate to another, which changes are usually accompanied by caking or agglomeration.

A prevalent cause of caking or of agglomeration in hydrous solid salts or mixtures of them is the transfer of water from one part to another and this is less likely to occur where all of the discrete particles are of the same composition or of the same vapor pressure and/or where the differences in composition or vapor pressure are small.

The disclosure herein is directed primarily to the compound, sodium metasilicate, and its various hydrates because it is believed to be industrially the most important crystalline soluble, or alkali metal, silicate. Other crystalline alkali metal silicates are known to exist such as sodium disilicate, potassium metasilicate, potassium disilicate, lithium metasilicate, and others are likely to be discovered. To the extent that the methods herein disclosed are applicable to the preparation of crystalline hydrates of other soluble silicates or other hydrates than those specifically mentioned, it is desired to include them within the scope of the invention.

With all of the foregoing in mind, the principal objects of my invention are:

1. The provision of an improved method for preparing crystalline hydrates of alkali metal silicates such as sodium metasilicate by which it is possible to produce these substances in staple form; (2) the provision of an improved method of preparing crystalline hydrates of alkali metal silicates such as sodium metasilicate by means of which solid masses of crystals can be manufactured which are characterized either by the predominance of a single hydrate or by combinations of hydrates which are stable toward each other at temperatures below their melting or transition points; (3) the provision of a method by which crystalline hydrates of alkali metal silicates such as sodium metasilicate can be prepared without adherent mother liquor, or, in other words, the provision of a method by which adherent mother liquor is avoided by a complete transformation of the liquid mass into crystal form; (4) the provision of a method of preparing crystalline or solid masses of various hydrates of the alkali metal silicates such as sodium metasilicate the individual particles of which will not agglomerate; (5) the provision of a method of preparing crystalline hydrates of alkali metal silicates such as sodium metasilicate which can be ground to powdery, granular or dusty condition, and (6) the provision of a method of preparing mixtures of crystalline hydrates of alkali metal silicates such as sodium metasilicate with other salts which mixtures are also stable and free of any tendency to agglomerate.

In disclosing the manner in which the advantages of this invention may be realized, I shall describe, in the first instance, a preferred procedure which will result in the formation of a crystalline sodium metasilicate characterized by the predominance of a single hydrate.

Generally stated, the starting point is a commercial solution of silicate of soda to which is added an amount of caustic soda calculated to bring the ratio between silica and sodium oxide to the theoretical composition of sodium metasilicate, $Na_2SiO_3$. The solution of sodium metasilicate may be made by other suitable methods, as by dissolving a fused mass of the proper composition, by the action of caustic soda on silica, etc. The amount of water in the solution is then adjusted either by evaporation or addition of water until the composition of the desired crystalline hydrate is obtained. The temperature of the mixture is then brought to substantially or preferably just a little below the melting point of the desired hydrate and preferably maintained in this neighborhood by means of artificial heating or cooling, if necessary, until the crystallization is substantially complete.

These solutions have a tendency to supercool without crystallizing and if crystallization does not begin spontaneously I may add a quantity of crystalline sodium metasilicate for the purpose of establishing foci of crystallization. It is usually preferable to use for seed a quantity of the hydrate which it is desired to produce. Thorough, complete, and prompt mixing of the seed is helpful for which reason I prefer to agitate during seeding and to continue the agitation as long as practicable. After the process of crystallization has advanced to the appropriate degree the mass may be removed from the agitating vessel and poured into molds in which it sets to a solid mass capable of being ground, the preferred temperature being maintained in any suitable way.

In this connection I should like to point out that heat is liberated during the process of crystallization and if the molds are of sufficient size the necessary temperature may be closely approximated without providing for additional heat.

I also wish to direct attention to the fact that there is a certain range of temperature within which any one hydrate can be formed and in which the operation of seeding and crystallization can take place, for the reason that each hydrate has a well defined melting point, and if the temperature of the mixture be maintained above the fusion point of the hydrates which melt at a lower temperature and yet not above the temperature at which the desired hydrate will melt (and preferably in the immediate neighborhood of the fusion point of the desired hydrate but slightly thereunder) then, with a mixture calculated for a certain hydrate, the said hydrate only will be formed and the entire mass will crystallize into the desired hydrate.

By way of specific examples for the carrying out of my invention as above outlined the following may be instanced, although they are by no means to be considered the only ways in which the invention can be carried out:

*Example for the preparation of $Na_2SiO_3.9H_2O$*

To 1000 parts by weight of a solution of sodium silicate containing 8.9% $Na_2O$ and 28.5% $SiO_2$ are added 79 parts of water and to this mixture 271 parts by weight of caustic soda containing 76% $Na_2O$. The solution will heat when the caustic is dissolved in it and any water lost by evaporation must be replaced. The total weight of the finished mixture should be 1350 parts by weight. If this is then cooled to a temperature just below 47° C. or 116° F., seeded, and agitated, and temperature maintained as described the entire mass will crystallize in such a condition that it can be ground.

*Example for the preparation of $Na_2SiO_3.5H_2O$*

To 1000 parts by weight of a solution of sodium silicate containing 8.9% $Na_2O$ and 28.5% $SiO_2$ 271 parts of caustic soda containing 76% $Na_2O$ are added. The solution is then evaporated until the total weight is reduced from 1271 parts to 1016 parts. The hot liquor should test just under 63° Baumé. This is cooled until the temperature is slightly below 70° C. or 158° F. If the mixture is now seeded and agitated and the temperature maintained just below 72° C., the entire mass will become solid and consist of crystals of $Na_2SiO_3.5H_2O$.

I wish it to be distinctly understood that there are other hydrates which can be produced according to the present method and my invention is intended to include within its scope the preparation of any such hydrates. I have found that the following hydrates at least may be made in accordance with the present invention:

| Hydrate | Melting point, approx. |
|---|---|
| $Na_2SiO_3.9H_2O$ | 47° C. |
| $Na_2SiO_3.8H_2O$ | 49° C. |
| $Na_2SiO_3.6H_2O$ | 62° C. |
| $Na_2SiO_3.5H_2O$ | 72° C. |

In addition there is considerable evidence that hydrates with four and two and one-half molecules of water exist and may be prepared in this manner but the constants have not been determined with sufficient precision to set down their exact melting or transition points.

While the foregoing represents a preferred method it is possible to produce certain combinations of hydrates which also will not agglomerate and which are stable at ordinary temperatures. For example, I have discovered that the following combinations of hydrates are stable:

$Na_2SiO_3.9H_2O$—$Na_2SiO_3.8H_2O$ transition point about 46.4° C.
$Na_2SiO_3.8H_2O$—$Na_2SiO_3.6H_2O$ transition point about 46° C.
$Na_2SiO_3.6H_2O$—$Na_2SiO_3.5H_2O$ transition point about 53° C.

In addition, there may be others which can be determined by experiment along the lines of the present invention, but for the sake of an illustrative example the following procedure may be adopted in producing a stable combination of hydrates.

*Example for the preparation of a mixture of $Na_2SiO_3.6H_2O$ and $Na_2SiO_3.8H_2O$ in the wet way*

To 1000 parts of a solution of sodium silicate containing 8.9% $Na_2O$ and 28.5% $SiO_2$ is added 271 parts of caustic soda containing 76% $Na_2O$. The solution formed is evaporated until the total weight is reduced from 1271 pounds to 1178 pounds. The solution is then cooled to slightly below 46° centigrade or 115° Fahrenheit which is the transition temperature for $Na_2SiO_3.8H_2O$ and $Na_2SiO_3.6H_2O$. The solution is then seeded with a mixture comprising 50 parts of powdered $Na_2SiO_3.8H_2O$ and 50 parts powdered $Na_2SiO_3.6H_2O$ and stirred thoroughly while maintaining the temperature. The entire mass will form a solid cake which may be ground.

As a matter of observation, I should like to point out that these hydrates are generally capable of being ground to a granular, powdered or dust-like form but this characteristic may vary in degree according to the inherent texture of the various crystal species. However, the present invention includes within its scope the preparation of any hydrate which will not agglomerate or cake at ordinary temperatures, the determining factor being whether or not the ultimate product will remain in a comparatively loose, unagglomerated condition of such a character that the material can be readily removed from the packages in which it is shipped.

The characteristics of stability and mobility of the granular or powdered products which are advantageous in sodium metasilicate hydrates apply also to salt mixtures of which sodium metasilicate hydrates may be a part. Starting with any definite hydrate of sodium metasilicate, the properties of which are known, it is possible to select materials for admixture therewith, by considering their action in contact with the particular hydrate of sodium metasilicate, and in this way to arrive at mixtures which are free-flowing and stable at ordinary temperatures. For example, crystalline hydrates of alkali metal carbonates, borates, or phosphates may be selected with respect to the partial pressure of water vapor which they exhibit and a sodium metasilicate hydrate of substantially similar partial pressure of water may be selected for admixture for the purpose of obtaining a combination in which a tendency of water to be transferred from one part to another is at a minimum. Such mixture may be made from the solid hydrates prepared separately or the two salts may be crystallized in the same wet mixture forming a solid mass without residual mother liquor which may be subsequently ground. It is in many cases possible to make the same mixture by either one of these methods. Anhydrous alkali metal salts may also be used to form stable mixtures with some of the crystalline hydrated silicates.

It will be obvious that the possible number of such mixtures is very great and that the conditions for producing them are dependent upon the individual peculiarities of the salt, the melting points of their various hydrates, and their possible reactions with sodium metasilicate. Without limiting myself to any particular mixture, the following examples are given by way of illustration showing stable mixtures prepared in the dry and the wet way.

*$Na_2SiO_3.5H_2O$—$Na_2CO_3$ prepared in the wet way*

To 1000 parts by weight of a solution of sodium silicate containing 8.9% $Na_2O$ and 28.5% $SiO_2$ are added 271 parts of caustic soda containing 76% $Na_2O$. When the caustic soda has completely dissolved, 800 pounds of anhydrous sodium carbonate is added. The mixture is then evaporated until the total weight has been reduced from 2071 parts to 1816 parts. This is cooled until the temperature is slightly below 70° centigrade or 158° Fahrenheit. If the mixture is now seeded with sodium metasilicate pentahydrate and agitated and the temperature maintained as described the entire mass will become solid and consist of a mixture of $Na_2SiO_3.5H_2O$ and $Na_2CO_3$ in such condition that it can be ground.

*$Na_2SiO_3.9H_2O$—$Na_3PO_4.12H_2O$ prepared in the dry way*

To 1000 parts of $Na_2SiO_3.9H_2O$ are added 1000 parts of $Na_3PO_4.12H_2O$ which is the usual commercial form of trisodium phosphate. The material may then be intimately mixed by means of shoveling it on a floor, passing through a screen, or by the use of any suitable mixing device.

*Example of the preparation of a mixture of $Na_2SiO_3.9H_2O$ and $Na_3PO_4.12H_2O$ in the wet way*

To 1000 parts by weight of a solution of sodium silicate containing 8.9% $Na_2O$ and 28.5% $SiO_2$ are added 79 parts of water and to this mixture 271 parts by weight of caustic soda containing 76% $Na_2O$. The solution will heat when the caustic is dissolved in it and any water lost by evaporation should be replaced. The total weight of the finished mixture should be 1350 parts by weight. This is then cooled to 60° C. and 200 parts by weight of commercial trisodium phosphate mixed in. The mass is further cooled to 47° C. or 116° F. and seeded with 100 parts of finely ground $Na_2SiO_3.9H_2O$, the mass being agitated and the temperature maintained just below 47° C. The mass is then poured into molds where it hardens to solid cakes which may then be ground.

With respect to the seeding and agitation referred to in connection with the foregoing disclosure, I should like to point out that the rate of crystallization among alkali metal silicates is relatively slow and it is, therefore, advantageous to employ an amount of seed which is sufficient to establish a large number of foci of crystallization and to thoroughly mix it into the solution in order that crystallization may take place substantially uniformly throughout the entire mass. If seeding and mixing are not thorough crystallization may be uneven with the formation of solid masses interspersed with or surrounded by areas of the sticky solution.

In connection with the work "stability" as used in the specification, it is desired to point out that it denotes a condition characterized by the absence of chemical change or transfer of water from or to a crystalline hydrate of sodium metasilicate to or from another hydrate, or another salt particle as the case may be, all extraneous water being excluded. The measure of such change is the tendency of the discrete particles to alter or agglomerate, and changes of such degree that this result does not take place will not alter the description of a salt or mixture, as stable. This condition is distinct from any tendency of the crystals to absorb moisture from the air.

Sodium metasilicate is useful in the arts among other things on account of its cleansing properties. It is characterized by having a high degree of alkalinity which is maintained until it is almost completely neutralized and is, therefore, useful in keeping at a high point the activity of cleansing solutions. At the same time its corrosive action is much less than that of caustic soda. These properties make it useful for such purposes as cleansing glassware such as milk bottles or beverage containers, for cleansing metals preparatory to plating or painting, and for use in connection with soap or other alkaline materials in the laundering of textile fabrics.

What I claim is:—

1. The method of making crystalline sodium metasilicate which includes preparing a solution calculated to satisfy the water requirements of a predetermined crystal composition and effecting crystallization thereof while maintaining the temperature between the melting temperature of the predetermined crystal composition and that of the crystal of next lower melting point.

2. The method of making crystalline sodium metasilicate which includes preparing a solution calculated to satisfy the water requirements of a predetermined crystal composition, maintaining the temperature between the melting temperature of the predetermined crystal composition and that of the crystal of next lower melting point, and seeding with sodium metasilicate of the same composition.

3. The method of making crystalline sodium metasilicate which includes preparing a solution calculated to satisfy the water requirements of a predetermined crystal composition, maintaining the temperature between the melting temperature of the predetermined crystal composition and that of the crystal of next lower melting point, and agitating and seeding with sodium metasilicate of the same composition.

4. The method of making a definite hydrate of sodium metasilicate which includes preparing a solution calculated to satisfy the water requirements of the desired hydrate and effecting crystallization thereof at a temperature which would fuse undesired hydrates of lower melting point.

5. The method of making a definite hydrate of sodium metasilicate which includes preparing a solution calculated to satisfy the water requirements of the desired hydrate and seeding with sodium metasilicate of the same composition at a temperature which would fuse undesired hydrates of lower melting point.

6. The method of making a definite hydrate of sodium metasilicate which includes preparing a solution calculated to satisfy the water requirements of the desired hydrate and agitating and seeding with sodium metasilicate of the same composition at a temperature which would fuse undesired hydrates of lower melting point.

7. The method of making a definite hydrate of sodium metasilicate which includes preparing a solution of the approximate composition of such hydrate, establishing a temperature substantially at the fusion point of the desired hydrate but slightly thereunder although above the fusion temperature of the hydrate of next lower melting point, and seeding the solution.

8. The method of making a definite hydrate of sodium metasilicate which includes preparing a solution of the approximate composition of such hydrate, establishing a temperature substantially at the fusion point of the desired hydrate but slightly thereunder although above the fusion temperature of the hydrate of next lower melting point, and seeding the solution while agitating.

9. The method of making a definite hydrate of sodium metasilicate which includes preparing a solution of the approximate composition of such hydrate and initiating crystallization thereof at a temperature slightly below the fusion temperature of the desired hydrate although above the fusion temperature of the hydrate of next lower melting point.

10. In a process for making a definite hydrate of sodium metasilicate the step which comprises seeding a solution of a composition corresponding to the hydrate sought with crystals of sodium metasilicate of the same composition in such manner as to provide a large number of foci of crystallization.

11. In a process for making a definite hydrate of sodium metasilicate the procedure which includes agitating and seeding a solution of a composition corresponding to the hydrate sought with crystals of sodium metasilicate of the same composition in such manner as to provide a large number of foci of crystallization.

12. As a new article of manufacture, crystalline sodium metasilicate in a stable hydrous form.

13. As a new article of manufacture, hydrated sodium metasilicate in the form of crystalline particles which are substantially dry, free flowing and stable in character.

14. As a new article of manufacture, hydrated sodium metasilicate characterized by the fact that crystallization of the mother liquor has been sufficiently complete to render the product substantially dry and stable.

15. As a new article of manufacture, hydrated sodium metasilicate characterized by the predominance of a single hydrate in substantially stable, dry condition.

16. As a new article of manufacture, substantially dry, free-flowing hydrated sodium metasilicate characterized by combinations of hydrates in substantially stable, dry condition.

17. A stable dust-like powder consisting of hydrous sodium metasilicate.

18. As a new article of manufacture stable hydrous sodium metasilicate in the form of granules which flow like dry sand.

19. The method of making a mixture of a definite crystalline sodium metasilicate and another alkali metal salt which includes preparing a solution of a composition corresponding to the said mixture and effecting crystallization thereof while maintaining the temperature in the neighborhood of the melting point of the sodium metasilicate in the said composition but slightly thereunder although above the fusion temperature of the crystalline metasilicate of next lower melting temperature.

20. The method of making a mixture of a definite crystalline sodium metasilicate and another alkali metal salt which includes preparing a solution of a composition corresponding to the said mixture, establishing a temperature in the neighborhood of the melting point of the sodium metasilicate in the said composition but slightly thereunder although above the fusion temperature of the crystalline metasilicate of next lower melting temperature, and seeding with sodium metasilicate of composition corresponding to the composition of the sodium metasilicate in the said mixture.

21. The method of making a mixture of a definite crystalline sodium metasilicate and another alkali metal salt which includes preparing a solution of a composition corresponding to the said mixture, establishing a temperature in the neighborhood of the melting point of the sodium metasilicate in the said composition but slightly thereunder although above the fusion temperature of the crystalline metasilicate of next lower melting temperature, and agitating and seeding with sodium metasilicate of composition corresponding to the composition of the sodium metasilicate in the said mixture.

22. The method of making a mixture of a definite crystalline sodium metasilicate and another alkali metal salt which includes preparing a solution of the desired composition and effecting crystallization thereof at a temperature which would fuse undesired hydrates of sodium metasilicate of lower melting point.

23. The method of making a mixture of a definite crystalline sodium metasilicate and another alkali metal salt which includes preparing a solution of the desired composition and seeding with sodium metasilicate of a composition corresponding to that of the desired hydrate at a temperature which would fuse undesired hydrates of sodium metasilicate of lower melting point.

24. The method of making a mixture of a definite crystalline sodium metasilicate and another alkali metal salt which includes preparing a solution of the desired composition and agitating and seeding with sodium metasilicate of a composition corresponding to that of the desired hydrate at a temperature which would fuse undesired hydrates of sodium metasilicate of lower melting point.

25. The method of making crystalline hydrates of alkali metal silicates which includes preparing a solution calculated to satisfy the water requirements of a predetermined crystal composition and effecting crystallization thereof while maintaining the temperature between the melting temperature of the said crystal composition and that of the crystal of next lower melting point.

26. The method of making crystalline hydrates of alkali metal silicates which includes preparing a solution calculated to satisfy the water requirements of a predetermined crystal composition, establishing a temperature between the melting temperature of the said crytal composition and that of the crystal of next lower melting point, and seeding the solution.

27. The method of making crystalline hydrates of alkali metal silicates which includes preparing a solution calculated to satisfy the water requirements of a predetermined crystal composition, establishing a temperature between the melting temperature of the said crystal composition and that of the crystal of next lower melting point, and seeding the solution while agitating.

28. The method of making a mixture of a definite crystalline hydrate of an alkali metal silicate and another alkali metal salt which includes preparing a solution of a composition corresponding to the said mixture and effecting crystallization thereof while maintaining the temperature in the neighborhood of the melting point of the said crystalline hydrate but slightly thereunder although above the fusion temperature of the crystalline hydrate of next lower melting temperature.

29. The method of making a mixture of a definite crystalline hydrate of an alkali metal silicate and another alkali metal salt which includes preparing a solution of a composition corresponding to the said mixture and seeding with crystalline hydrate of a composition corresponding to that in the mixture while maintaining the temperature in the neighborhood of the melting point of the said crystalline hydrate but slightly thereunder although above the fusion temperature of the crystalline hydrate of next lower melting temperature.

30. The method of making a mixture of a definite crystalline hydrate of an alkali metal silicate and another alkali metal salt which includes preparing a solution of a composition corresponding to the said mixture and agitating and seeding with crystalline hydrate of a composition corresponding to that in the mixture while maintaining the temperature in the neighborhood of the melting point of the said crystalline hydrate but slightly thereunder although above the fusion temperature of the crystalline hydrate of next lower melting temperature.

31. The method of claim 25 wherein crystallization is effected at foci of crystallization distributed throughout substantially the entire mass.

32. The method of making crystalline sodium metasilicate which includes preparing a solution calculated to satisfy the water requirements of a predetermined crystal composition, establishing a temperature between the melting temperature of the predetermined crystal composition and that of the crystal of next lower melting point, and seeding the solution so as to establish crystallization at foci of crystallization distributed throughout substantially the entire mass.

33. The method of making a definite hydrate of sodium metasilicate which includes preparing a solution of the approximate composition of the said hydrate and initiating crystallization thereof at approximately the fusion temperature of the said hydrate but slightly thereunder although above the fusion temperature of the hydrate of next lower melting point, the crystallization being effected at foci of crystallization distributed throughout substantially the entire mass.

34. As a new article of manufacture, a crystalline silicate of an alkali metal in a stable hydrous form.

35. As a new article of manufacture, hydrated silicate of an alkali metal characterized by the predominance of a single hydrate in substantially stable, dry condition.

36. As a new article of manufacture, hydrated silicate of an alkali metal characterized by combinations of hydrates in substantially stable, dry condition.

37. As a new article of manufacture, hydrated silicate of an alkali metal characterized by the fact that crystallization of the mother liquor has been sufficiently complete to render the product substantially dry and stable.

38. As a new article of manufacture, sodium metasilicate pentahydrate $$(Na_2SiO_3.5H_2O)$$

in the form of crystalline particles which are substantially dry, free flowing, and stable in character.

39. A stable dust-like powder consisting of crystalline hydrous silicate of alkali metal.

40. As a new article of manufacture, stable crystalline hydrous silicate of alkali metal in the form of granules, which flow like dry sand.

41. As a new article of manufacture, sodium metasilicate nonahydrate $(Na_2SiO_3.9H_2O)$ in the form of crystalline particles which are substantially dry, free flowing, and stable in character.

42. As a new article of manufacture, the product of claim 19.

43. As a new article of manufacture, the product of claim 28.

44. The method of making a mixture of a definite crystalline hydrate of an alkali metal silicate and another alkali metal salt which includes preparing a solution of a composition corresponding to the said mixture, establishing a temperature in the neighborhood of the melting point of the said definite crystalline hydrate but slightly thereunder although above the fusion temperature of the crystalline hydrate of next lower melting temperature, and seeding with crystalline hydrate of composition corresponding to the composition of the crystalline hydrate in the said mixture.

45. As a new article of manufacture, the product of claim 44.

In testimony whereof I have hereunto signed my name.

CHESTER L. BAKER.